United States Patent
Manger et al.

(10) Patent No.: US 11,054,305 B2
(45) Date of Patent: *Jul. 6, 2021

(54) METHOD AND DEVICE FOR BEAM ANALYSIS

(71) Applicant: Carl Zeiss SMT GmbH, Oberkochen (DE)

(72) Inventors: Matthias Manger, Aalen-Unterkochen (DE); Christoph Husemann, Jena (DE); Matus Kalisky, Aalen (DE); Lars Stoppe, Jena (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/694,115

(22) Filed: Nov. 25, 2019

(65) Prior Publication Data

US 2020/0088571 A1 Mar. 19, 2020

Related U.S. Application Data

(63) Continuation of application No. 15/918,746, filed on Mar. 12, 2018, now Pat. No. 10,605,654, which is a
(Continued)

(30) Foreign Application Priority Data

Oct. 7, 2015 (DE) .......................... 102015219330.6

(51) Int. Cl.
*B23K 26/04* (2014.01)
*G01J 1/42* (2006.01)
(Continued)

(52) U.S. Cl.
CPC .......... *G01J 1/4257* (2013.01); *B23K 26/032* (2013.01); *B23K 26/04* (2013.01); *B23K 26/705* (2015.10);
(Continued)

(58) Field of Classification Search
CPC ..... G01J 1/4257; G01J 1/0411; G02B 27/106; G02B 27/1086; B23K 26/705
(Continued)

(56) References Cited

U.S. PATENT DOCUMENTS 3,912,395 A * 10/1975 Voggenthaler ......... G02B 27/42
356/124
5,329,350 A 7/1994 Wright et al.
(Continued)

FOREIGN PATENT DOCUMENTS

DE     101 09 929 A1    11/2001
DE     699 02 148 T2    2/2003
(Continued)

OTHER PUBLICATIONS

International Search Report for corresponding Appl No. PCT/EP2016/073785, dated Apr. 13, 2017.
(Continued)

*Primary Examiner* — Isiaka O Akanbi
(74) *Attorney, Agent, or Firm* — Fish & Richardson P.C.

(57) ABSTRACT

A method and an apparatus for beam analysis in an optical system are disclosed, wherein a plurality of beam parameters of a beam propagating along an optical axis are ascertained. The method includes: splitting the beam into a plurality of partial beams which have a focus offset in the longitudinal direction in relation to the optical axis; recording a measurement image produced by these partial beams; carrying out a forward simulation of the beam in the optical system on the basis of estimated initial values for the beam parameters in order to obtain a simulated image; and calculating a set of values for the beam parameters on the basis of the comparison between the simulated image and the measurement image.

22 Claims, 12 Drawing Sheets

Related U.S. Application Data continuation of application No. PCT/EP2016/073785, filed on Oct. 5, 2016.

(51) Int. Cl.
| | |
|---|---|
| *G01J 1/04* | (2006.01) |
| *G02B 27/10* | (2006.01) |
| *B23K 26/03* | (2006.01) |
| *B23K 26/70* | (2014.01) |

(52) U.S. Cl.
CPC .......... *G01J 1/0407* (2013.01); *G01J 1/0411* (2013.01); *G01J 1/0418* (2013.01); *G02B 27/106* (2013.01); *G02B 27/1086* (2013.01)

(58) Field of Classification Search
USPC .......................................... 356/124, 121, 218
See application file for complete search history.

(56) References Cited

U.S. PATENT DOCUMENTS

| | | | | |
|---|---|---|---|---|
| 6,236,483 | B1* | 5/2001 | Dutt | H04K 1/04 398/141 |
| 6,339,469 | B1 | 1/2002 | Bruel et al. | |
| 7,532,378 | B2* | 5/2009 | Tanaka | B23K 26/067 359/224.2 |
| 2002/0001088 | A1* | 1/2002 | Wegmann | G03F 7/706 356/521 |
| 2004/0174506 | A1 | 9/2004 | Smith | |
| 2007/0071169 | A1 | 3/2007 | Yeo | |
| 2009/0185132 | A1 | 7/2009 | Raymond et al. | |
| 2011/0204249 | A1 | 8/2011 | Nagai et al. | |
| 2011/0249256 | A1 | 10/2011 | Scaggs | |
| 2012/0050713 | A1* | 3/2012 | Inoue | G02B 27/4233 356/3.11 |
| 2015/0043000 | A1 | 2/2015 | Mochizuki | |
| 2015/0277052 | A1* | 10/2015 | Keyworth | G02B 6/272 385/17 |
| 2015/0355052 | A1 | 12/2015 | Stoppe | |
| 2016/0341969 | A1 | 11/2016 | Manger | |
| 2016/0377850 | A1* | 12/2016 | Anhut | G02B 21/0032 359/385 |
| 2017/0188901 | A1 | 7/2017 | Faraon | |
| 2018/0202860 | A1 | 7/2018 | Manger et al. | |

FOREIGN PATENT DOCUMENTS

| | | |
|---|---|---|
| WO | WO 2009/058747 | 5/2009 |
| WO | WO 2015/113713 A | 8/2015 |

OTHER PUBLICATIONS

International Preliminary Report on Patentability for App. Ser. No. PCT/EP2016/073785 (with English translation), dated Apr. 18, 2018, 21 pages.
German Office Action for App. Ser. No. DE 10 2015 219 330.6 (with English translation), dated Aug. 30, 2016, 4 pages.
European Office Action, with translation therein, for corresponding EP Appl No. 16785380.3, dated Sep. 2, 2019.
Extending European Search Report, including English Translation, issued in corresponding EP Application No. 20197125.6 dated Jan. 25, 2021, 11 pages.

* cited by examiner

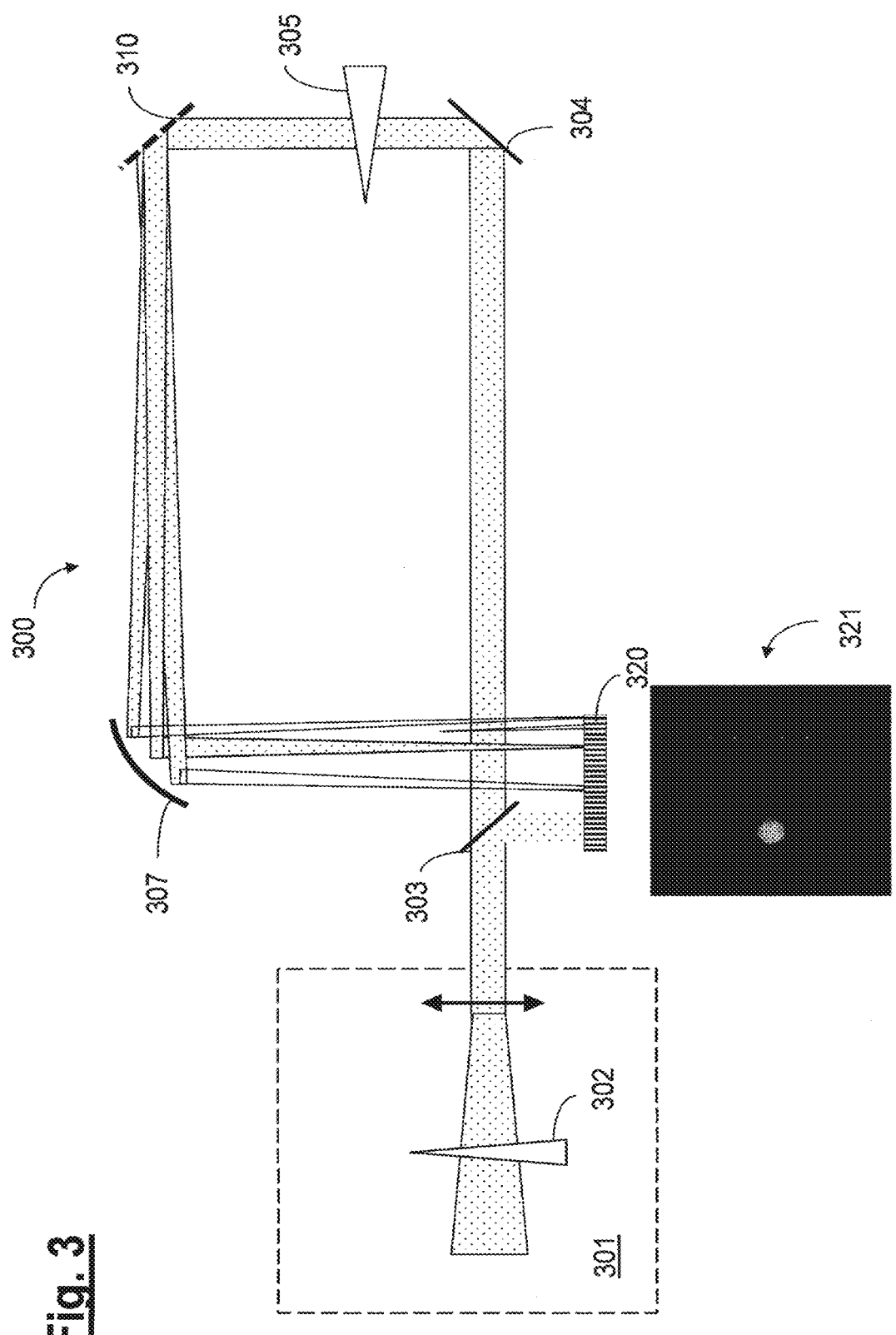

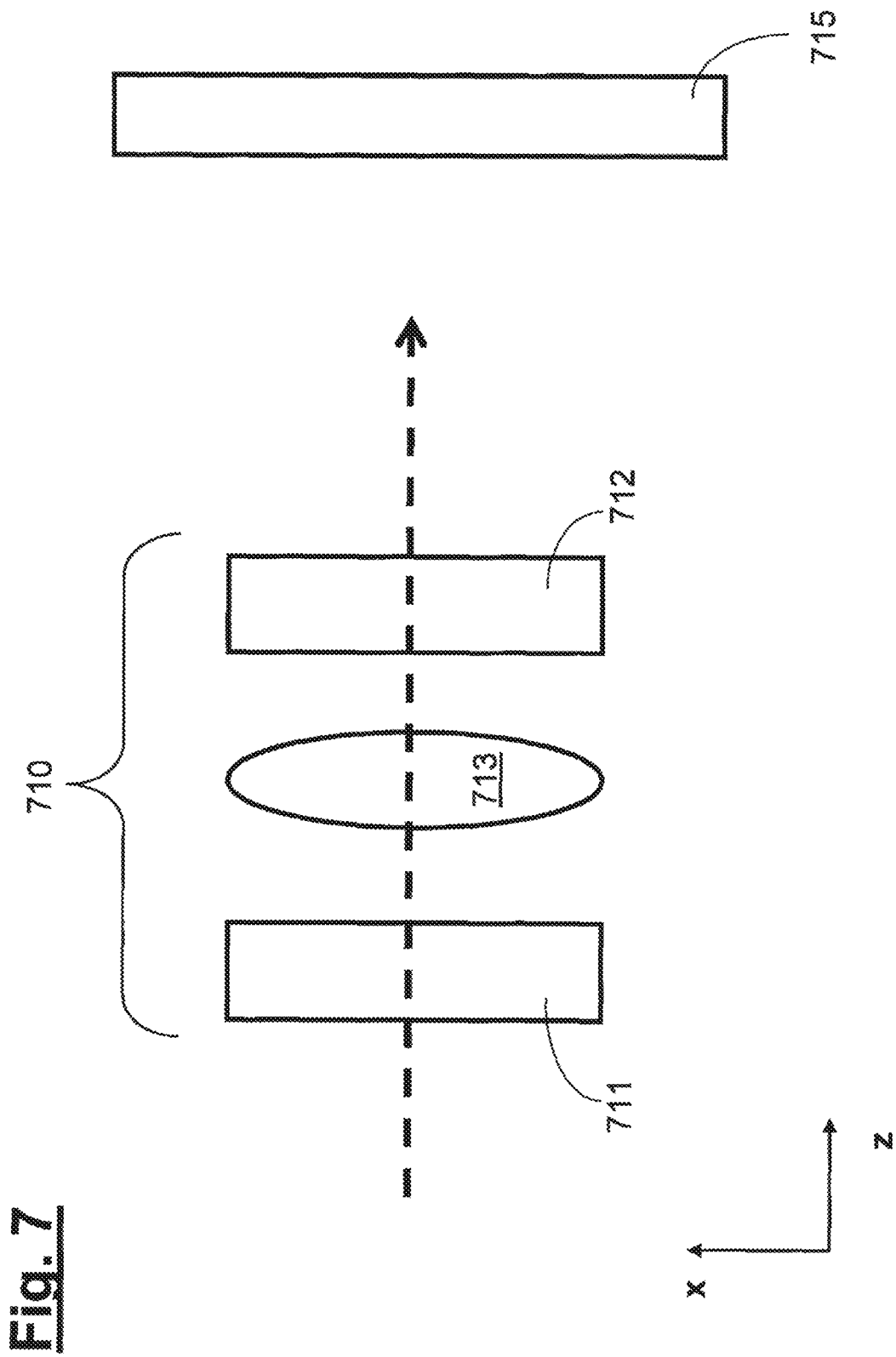

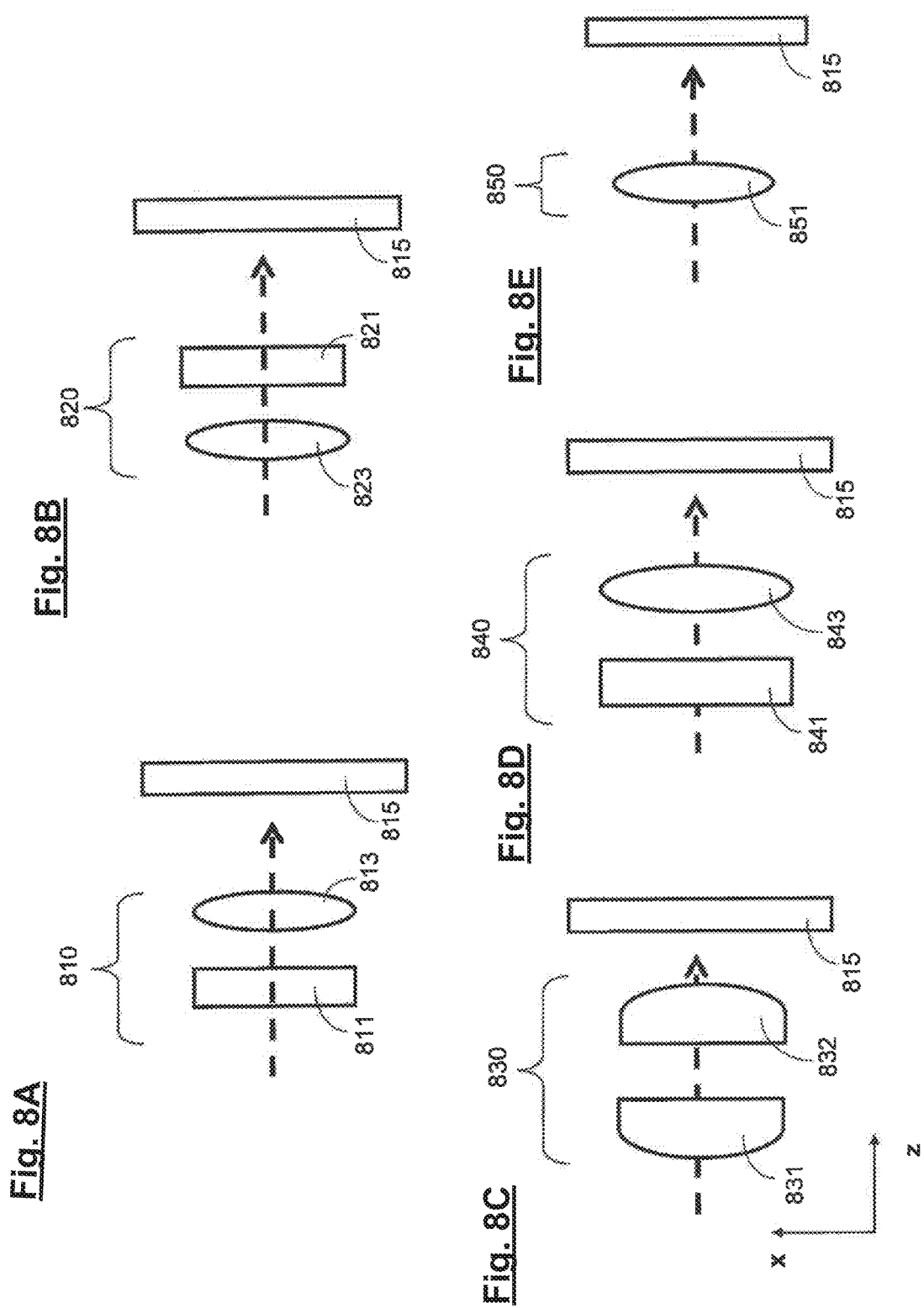

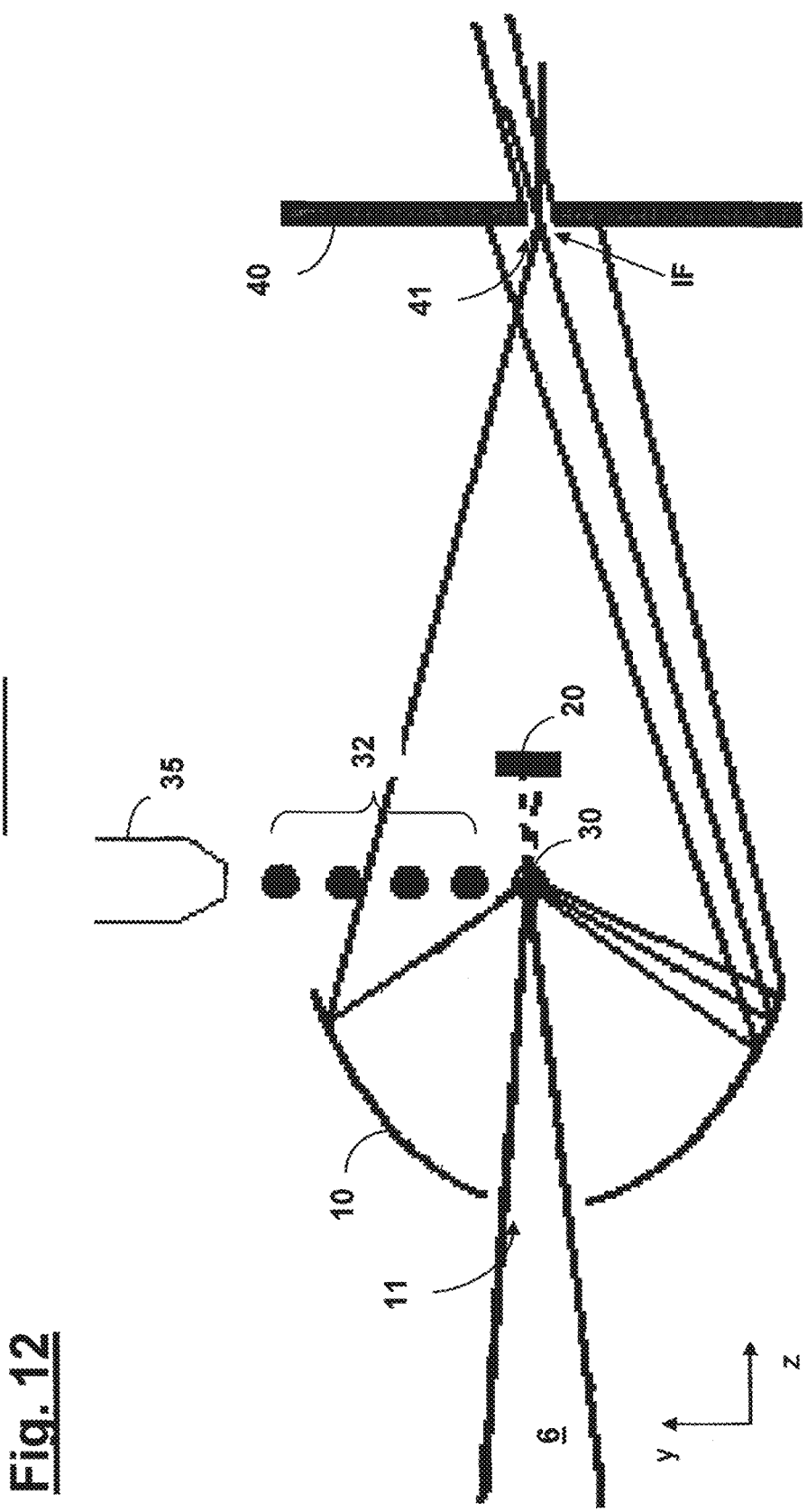

METHOD AND DEVICE FOR BEAM ANALYSIS

CROSS-REFERENCE TO RELATED APPLICATIONS

The present application is a continuation of, and claims benefit under 35 USC 120 to, U.S. application Ser. No. 15/918,746, filed Mar. 12, 2018, which a continuation of, and claims benefit under 35 USC 120 to, international application PCT/EP2016/073785, filed Oct. 5, 2016, which claims benefit under 35 USC 119 of German Application No. 10 2015 219 330.6, filed on Oct. 7, 2015. The entire disclosure of these applications are incorporated by reference herein.

FIELD

The disclosure relates to a method and an apparatus for beam analysis in an optical system. In particular, the disclosure can be used to also obtain information about possible wavefront deviations in the case of a laser beam by way of an analysis of the geometric beam parameters (such as spatial orientation and tilt) and to correct these, optionally in real time, during the operation of the respective optical system.

The disclosure is suitable for analyzing electromagnetic radiation, as is used in e.g. laser plasma sources (for example, in the case of an EUV source of a microlithographic projection exposure apparatus), but it is not restricted thereto. In further applications, the disclosure is also generally suitable for analyzing electromagnetic radiation which is used for any desired purposes (in particular measurement purposes or diagnostic purposes).

BACKGROUND

Many laser applications involve knowledge that is as accurate as possible with respect to beam parameters such as e.g. the beam size, beam decentration, beam inclination or beam divergence, and also involve the correction of aberrations (such as e.g. astigmatism, coma and spherical aberration).

An issue occurring here in practice is that, e.g., thermally induced wavefront changes or aberrations of the laser beams may occur, knowledge about which that is as exact as possible being involved for a correction that takes place during the operation (in real time).

However, in this case, the use of sensors that are conventionally used for wavefront measurement (such as, e.g., so-called Shack-Hartmann sensors with a CCD camera situated in the focal plane of the microlens arrangement) only has restricted suitability to the extent that, on account of the geometric reference centers (e.g., vertices or apertures of the lenses in the microlens arrangement in the case of a Shack-Hartmann sensor) that have been introduced, as a matter of principle, by the measurement arrangement, the respective measurement result is also influenced by effects which are based on the interaction or shearing of the coordinate system of the laser radiation on the one hand with the coordinate system of the measurement arrangement on the other (such that the intrinsic coordinate system inherent to the measurement arrangement is virtually "impressed" onto the measurement result). This has as a consequence, in particular, that beam disturbances occurring during the measurement, for instance as a consequence of a positional change of the measurement arrangement relative to the laser beam, are immediately noticeable in the measurement result and, in this respect, make a reliable wavefront analysis more difficult, or prevent the latter, since it is not determinable whether a measured wavefront effect is based on an actually occurred (e.g. thermally induced) wavefront modification or only based on a positional change (e.g. "wobbling") of the measurement arrangement relative to the laser beam.

Expressed differently, there is a need during the analysis of wavefront aberrations of a laser beam to ascertain the wavefront aberrations in the coordinate system of the laser beam itself (and not in that of the measurement arrangement).

Moreover, there is also a need to obtain the corresponding results sufficiently quickly during the operation of the respective system in order to be able to promptly correct possible wavefront aberrations, for instance using an adaptive mirror or the like.

A purely exemplary laser application is the laser plasma source which is used in e.g. lithography for producing EUV light (e.g. at wavelengths of e.g. approximately 13 nm or approximately 7 nm) and with respect to which FIG. 12 shows a schematic illustration of the possible construction. The EUV laser plasma source according to FIG. 12 has a high-energy laser (not shown here) e.g. for generating infrared radiation 6 (e.g. a $CO_2$ laser with a wavelength of $\lambda \approx 10.6$ μm), the infrared radiation being focused by way of a focusing optical unit, passing through an opening 11 present in a collector mirror 10 embodied as an ellipsoid and being guided onto a target material 32 (e.g. tin droplets) which is generated via a target source 35 and supplied to a plasma ignition position 30. The infrared radiation 6 heats the target material 32 situated in the plasma ignition position 30 in such a way that the target material transitions into a plasma state and emits EUV radiation. This EUV radiation is focused by way of the collector mirror 10 onto an intermediate focus IF and enters through the latter into a downstream illumination device, the edge 40 of which is merely indicated and which has a free opening 41 for the light entrance.

Both the droplet position of the (e.g., tin) droplets forming the target material and the focus position of the laser beams to be tracked accordingly can be determined using a so-called beam propagation camera, wherein both the laser beams in the "forward direction" (the infrared radiation 6 prior to incidence on the respective target droplets) and the laser beams in the "backward direction" (the infrared radiation 6 reflected back from the respective target droplet) are detected and the measurement data involved for the laser beam guidance and droplet guidance are obtained. Here, there is a need to be able to promptly correct thermally induced aberrations, involving an accurate and fast analysis of the laser beams.

With regard to the prior art, reference is made by way of example to WO 2015/113713 A1.

SUMMARY

The disclosure seeks to provide a method and an apparatus for beam analysis, which facilitate a reliable analysis that is effectuated sufficiently quickly and as free from disturbances as possible.

In an aspect, the disclosure provides a method for beam analysis in an optical system, wherein a plurality of beam parameters of a beam propagating along an optical axis are ascertained. The method includes the following steps: a) splitting the beam into a plurality of partial beams which have a focus offset in the longitudinal direction in relation to the optical axis; b) recording a measurement image produced by these partial beams; c) carrying out a forward simulation of the beam in the optical system on the basis of estimated initial values for the beam parameters in order to obtain a simulated image; and d) calculating a set of values for the beam parameters on the basis of a comparison between the simulated image and the measurement image.

In an aspect, the disclosure provides an apparatus beam analysis in an optical system, having at least one beam-splitting optical arrangement, which brings about beam splitting of a beam, incident on the beam-splitting optical arrangement along an optical axis during operation, into a plurality of partial beams which have a focus offset in a longitudinal direction in relation to the optical axis, and at least one sensor arrangement for capturing these partial beams.

A method according to the disclosure for beam analysis in an optical system, wherein a plurality of beam parameters of a beam propagating along an optical axis are ascertained, includes the following steps:

splitting the beam into a plurality of partial beams which have a focus offset in the longitudinal direction in relation to the optical axis, recording a measurement image produced by these partial beams, carrying out a forward simulation of the beam in the optical system on the basis of estimated initial values for the beam parameters in order to obtain a simulated image, and calculating a set of values for the beam parameters on the basis of the comparison between the simulated image and the measurement image.

Within the scope of the present application, "splitting a beam into a plurality of partial beams" should be understood to mean that these partial beams each constitute a copy of the original split beam to the extent that the partial beams in each case have the same geometric parameters as the original beam, with only the intensity of the partial beams being correspondingly reduced in relation to the intensity of the original beam as a result of the split into a plurality of partial beams. As a result, the beam-splitting optical arrangement is used to replicate the beam to be analyzed into a plurality of partial beams in a suitable manner, wherein a sensor arrangement with a suitable extent can be used to simultaneously record a plurality of beam sections or measurement spots.

According to an embodiment, the method further includes the steps of:

iteratively performing the steps of the forward simulation and of calculating a set of values for the beam parameters, wherein the respectively calculated values for the beam parameters form the basis of a forward simulation that follows in each case, and outputting output values for the beam parameters, ascertained by this iteration.

Consequently, according to an embodiment of the disclosure, the calculation of a set of values for the beam parameters is effectuated, in particular iteratively, on the basis of the plurality of comparisons between recorded measurement images and calculated or simulated images. This takes account of the fact that unavoidable interferences occur between the measurement images ("spot images") assigned to the individual, different focus positions, wherein the interferences may, in particular, lead to comparatively large mutual disturbances of the spots. The individual measurement images assigned to different focus positions cannot simply be considered to be independent of one another on account of the mutual disturbances, which in turn is an obstacle to a "separate" forward and backward propagation—in which, for example, the components of the beam-splitting optical arrangement assigned to the individual focus positions are considered to be decoupled or are considered independently—through the optical system or which prevents a correct back calculation to the beam parameters.

According to an embodiment, the method further includes the step of recording a near-field image produced by the beam.

Recording the near-field image and recording a far-field image that corresponds to the measurement image produced by the partial beams may be effectuated at the same time. Further, use can also be made of more than one sensor arrangement for recording the measurement images (e.g. a sensor arrangement for recording the near-field image and a further sensor arrangement for recording the far-field image).

Here, "near field" denotes the amplitude or intensity distribution in a sectional plane perpendicular to the direction of propagation in the region of the collimated beam (i.e. expanded or virtually divergence-free beam). The "far field", by contrast, corresponds to the amplitude or intensity distribution in a plane near the waist, or near the focus, perpendicular to the beam propagation in the region of the focused or convergent beam.

Recording the near-field image renders it possible to directly determine the absolute value component of the complex amplitude function (as square root of the intensity) for the beam to be analyzed, immediately in the near field. This is particularly advantageous to the extent that the absolute value of the amplitude can only be determined with difficulties from the far-field image (i.e. the image close to the focus after passing through the beam-forming and beam-splitting optics) since the focusing properties or far-field images are substantially dominated by the phase of the electromagnetic radiation and the absolute value of the amplitude in the far field is only poorly accessible. Consequently, the disclosure explicitly takes account of the fact that near field and far field, in a sense, carry complementary information to the extent that they image different aspects of the complex amplitude function. A consequence of the concept according to the disclosure is that substantially only the wavefront or the phase of the complex amplitude still needs to be determined from the far-field image. Therefore, as a result, the reconstruction result in the case of the additional consideration of the near-field information according to the disclosure is improved significantly when compared to only taking account of the far-field information.

The circumstance that, according to the disclosure, the complete information for the beam evaluation is already supplied by a single recording effectuated by a sensor arrangement (i.e. the simultaneous recording of a near-field image and a far-field image) has the further advantage that, in the case of e.g. a pulsed laser or else in the case of other laser types (such as e.g. CW-lasers) with pronounced fluctuations in the beam properties, it is possible to carry out individual (e.g. pulse-resolved) wavefront analyses (in a sense as "single shot" measurements).

According to an embodiment, the plurality of beam parameters includes at least one of the following parameters: beam size, beam decentration, beam inclination, beam divergence, astigmatism, coma, spherical aberration, and possibly further parameters as well. The aberrations may be of any order and, for example, may be described in a hierarchic function system that is ideally adapted to the symmetry (e.g. Zernike polynomials).

According to an embodiment there is, on the basis of the output values for the beam parameters, a manipulation of the beam while adapting at least one of the beam parameters.

According to an embodiment, outputting the output values and adapting at least one of the beam parameters are effectuated in real time during the operation of the optical system.

Within the scope of the iterative performance of the steps of the forward simulation and of calculating a set of values for the beam parameters, the number of varied beam parameters is varied, in particular reduced, according to an embodiment.

Here, the disclosure contains the further concept of adapting the scope of the model by using the respectively previously ascertained image within the meaning of an adaptive procedure.

On account of this, it is possible to take account of the fact that enabling a large number of parameters when iteratively performing the steps of the forward simulation and of calculating a set of values for the beam parameters leads to a high numerical complexity, which may, under certain circumstances, be opposed to determining and adapting the beam parameters in real time (e.g. the beam adaptation in a laser plasma source). Preferably, there may initially be, for example, a start with a comparatively small scope of the parameters set, which is then successively expanded with respect to the simultaneously varied parameters within the further course of the iteration of the parameters set (i.e. adaptive fitting of the model is undertaken).

Within the scope of the iterative performance of the steps of the forward simulation and of calculating a set of values for the beam parameters, an algorithm used in this iteration is varied according to an embodiment.

By way of example, a faster evaluation method for obtaining the highest possible speed in the beam analysis may be selected after reaching a quasi-stationary operation of the respective system (e.g. the plasma light source), during which there only still are small changes in the beam parameters. Here, in particular, use can be made of the information already collected previously in order then to be able to determine and correct, in real time, the small changes in the beam parameters that still occur.

As a result, what may be achieved thus is that, for instance in a plasma light source, the laser beam can be guided, accurately and quickly at the same time, with respect to the beam parameters since, for example, thermally induced aberrations can be corrected promptly.

According to an embodiment, the beam is split using a beam-splitting optical arrangement, which brings about spherical wavefront deformations of the beam. Here, the disclosure is based on the further concept of realizing a wavefront determination on the basis of a split, obtained by spherical wavefront deformations of the beam, into a plurality of partial beams, which are assigned to different focus positions.

As a result of only spherical wavefront deformations of the beam being performed for splitting the beam, the impression of an additional coordinate system on account of the measurement arrangement and, hence, an unwanted interaction or shearing of such a coordinate system with the coordinate system of the laser radiation are avoided. Here, the disclosure proceeds from the idea that a spherical wavefront does not have a center or a point that is marked out in any way on account of the curvature that is constant at each point such that no special coordinate system, which may be impressed onto the coordinate system of the laser radiation, is produced either by way of a measurement arrangement constructed in such a way. In principle, an optical system that only causes spherical wavefront deformations of the beam may be constructed from lens elements, but also, for example, from a diffractive optical element.

In accordance with an embodiment, the beam-splitting optical arrangement has at least one diffractive structure.

Here, the disclosure further contains the concept of, by using a diffractive structure, obtaining the plurality of focus positions which are generated by such a diffractive structure and which correspond to the different orders of diffraction of the diffractive structure in order to realize the longitudinal focus offset. In other words, the disclosure makes use in a targeted manner of the usually unwanted property of a diffractive lens element of generating mutually different focus positions in accordance with the different orders of diffraction in order to realize a longitudinal focus offset for beam analysis. At the same time, the disclosure makes use of the further circumstance that a lateral offset of the partial beams beyond the aforementioned longitudinal focus offset for enabling simultaneous recording at the location of the sensor arrangement is achievable in a comparatively simple manner by way of a "break in symmetry" which, for example, can be obtained by a simple decentration of the diffractive structure (either by displacement in a plane perpendicular to the optical axis or already by an appropriate design of the diffractive structure).

According to an embodiment, the beam-splitting optical arrangement is designed in such a way that it splits a beam incident on the arrangement into partial beams, wherein the points of incidence of these partial beams form a two-dimensional, grid-like distribution on a plane extending transversely to the light propagation direction of the beam (wherein this plane may be, in particular, the detector plane in which the aerial image is produced). Here, the points of incidence may be defined as the geometric center of the respective centroid rays or as points of the respective partial beams that are distinguished in another suitable way. Furthermore, the term "two-dimensional, grid-like distribution" should also include non-regular or non-periodic two-dimensional distributions.

According to an embodiment, the beam-splitting optical arrangement has at least two diffractive structures, which extend in mutually different directions, in particular mutually perpendicular directions.

Such a configuration of the beam-splitting optical arrangement according to the disclosure was found to be advantageous in multiple respects, wherein reference should be made in this context to, first of all, the more efficient fill of a sensor or detector plane (which typically extends in two planes). However, moreover, a significant increase of the measurement range with an unchanging high resolution may be obtained in the case of a suitable design of the beam-splitting optical arrangement or of the diffractive structures provided therein—as will still be explained in more detail below. This measurement range increase may, in turn, serve firstly to increase the "capture region" with respect to capturable focus values of the beam to be analyzed in the case of an unchanging high resolution (namely under the provision of a sufficient number of measurement points in the relevant focus region). In this way, it is possible to take account of the comparatively large focus variations of the beam to be characterized, as occur as a consequence of heating and deformation of the individual optical components in, for example, applications of material processing or else the laser plasma source, described at the outset, in the case of high laser powers. Here, it may be possible, under certain circumstances, to also realize an ISO-compliant beam characterization to the extent that a sufficient number of measurement points are respectively obtained both in the immediate vicinity of the focus of the beam to be analyzed and also at a sufficient distance from this focus. Secondly, if desired, a redundancy with respect to the provided measurement points or focus values may be obtained within the respectively covered measurement range—as will likewise still be explained in more detail below—which, in turn, can be used to calibrate the measurement system.

According to an embodiment, these diffractive structures differ by at least a factor of 3, in particular by at least a factor of 4, further particularly by at least a factor of 5, in terms of their focal length related to the first positive order of diffraction in each case.

According to an embodiment, the optical system is a laser plasma source.

However, the disclosure is not restricted thereto but applicable in many other fields. By way of example, an application may be effectuated in laser metrology (e.g. wherever Shack-Hartmann sensors are conventionally used). Further advantageous applications of the disclosure relates to medical engineering, material processing and communication technology.

Further, the disclosure relates to an apparatus for beam analysis in an optical system, having at least one beam-splitting optical arrangement, which brings about beam splitting of a beam, incident on the beam-splitting optical arrangement along the optical axis during operation, into a plurality of partial beams which have a focus offset in a longitudinal direction in relation to the optical axis, and at least one sensor arrangement for capturing these partial beams.

The disclosure further also relates to a beam-splitting optical arrangement, wherein the arrangement brings about beam splitting of a beam, incident on the beam-splitting optical arrangement along the optical axis during operation, into a plurality of partial beams which have a focus offset in a longitudinal direction in relation to the optical axis, wherein the points of incidence of these partial beams form a two-dimensional, grid-like distribution on a plane extending transversely to the light propagation direction of the beam.

The apparatus according to the disclosure for beam analysis or the beam-splitting optical arrangement may be configured, in particular, for carrying out a method having the features described above. With regard to advantages and preferred configurations of the apparatus and the arrangement, reference is made to the explanations above in conjunction with the method according to the disclosure.

However, the apparatus or arrangement is not restricted to the application in the above-described method. The apparatus or arrangement is also usable in applications in which a focus reconstruction (with respect to focus position and focus size) can be performed without reconstructing the phase.

Further configurations of the disclosure can be gathered from the description and the dependent claims.

BRIEF DESCRIPTION OF THE DRAWINGS

The disclosure is explained in greater detail below on the basis of exemplary embodiments illustrated in the accompanying figures, in which:

FIG. 3 shows a schematic illustration of a further embodiment of a measurement arrangement used in an exemplary manner in a method according to the disclosure;

FIGS. 7, 8A-8E, 9, 10, 11A, 11B and 11C show schematic illustrations for explaining further embodiments of the disclosure; and FIG. 12 shows a schematic illustration of the design of an EUV light source in accordance with the prior art.

DETAILED DESCRIPTION OF PREFERRED EMBODIMENTS

Figure 1:
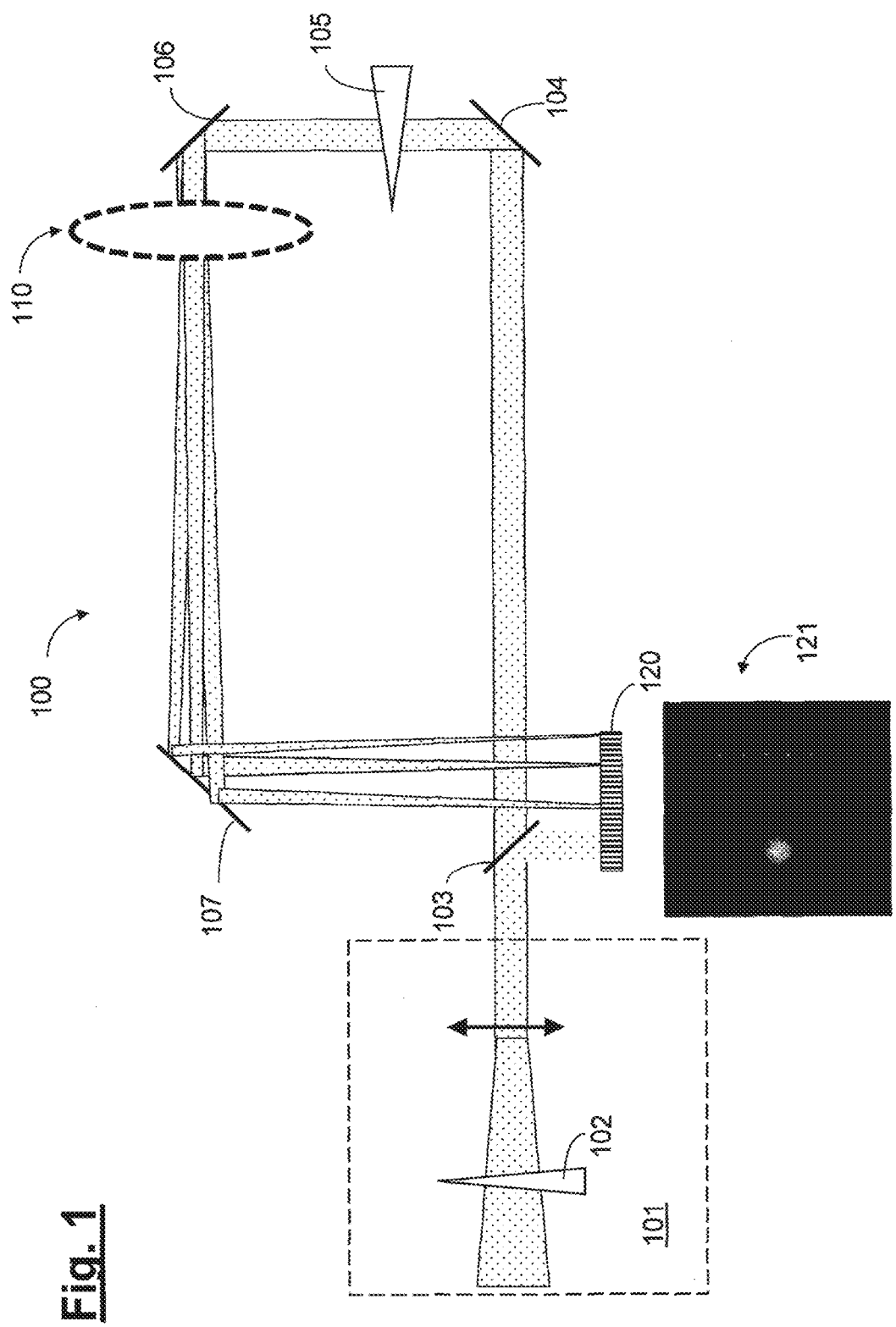
FIG. 1 shows a schematic illustration of a measurement arrangement used in an exemplary manner in a method according to the disclosure.

According to FIG. 1, a beam to be analyzed, which is produced by a laser light source (not depicted here) and comes from a telescope unit 101 (which has, inter alia, an attenuator 102 in FIG. 1), is initially incident on an optical beam splitter 103 in an exemplary measurement arrangement, part of the beam being decoupled immediately by the optical beam splitter and being steered onto a sensor arrangement 120 (e.g. In the form of a CMOS arrangement or a CCD arrangement). The portion transmitted through the beam splitter 103 reaches a beam-splitting optical arrangement 110 via deflection mirrors 104, 106 (between which a further attenuator 105 is arranged) and the sensor arrangement 120 from the beam-splitting optical arrangement via a further deflection mirror 107. Consequently, according to FIG. 1, a near-field image that is produced by the immediately decoupled part of the beam is also recorded in addition to the far-field image that is produced by the part of the beam that is steered via the beam-splitting optical arrangement 110. As already explained, this is advantageous in that the absolute value of the amplitude is already present in an immediate form and therefore it is only still involved to substantially determine the wavefront or the phase of the complex amplitude by way of a retrieval scheme yet to be explained below.

Figure 2A:
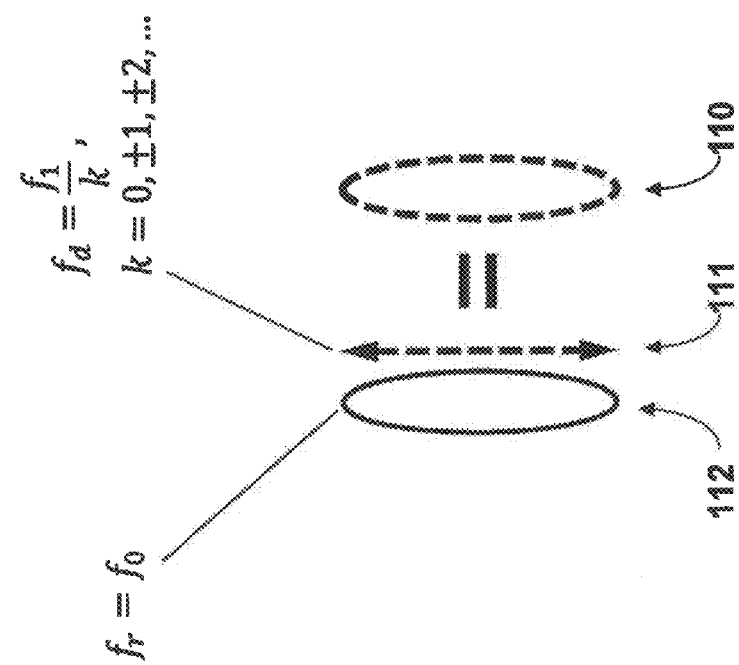
FIGS. 2A and 2B show a schematic illustration (FIG. 2A) and a diagram (FIG. 2B) for explaining construction and functionality of an exemplary embodiment of a beam-splitting optical arrangement.

In the exemplary embodiment, as indicated in FIG. 2A, the beam-splitting optical arrangement 110 has a diffractive structure 111 and a refractive optical element (refractive lens element) 112, which have a monolithic embodiment here and together form a multi-focal optical element. In a specific exemplary embodiment, the refractive optical element 112 can be a plano-convex lens element, wherein the diffractive structure 111 can be formed on the plane surface of this plano-convex lens element. The diffractive structure and refractive optical element or lens element can also have a separate configuration and a (preferably small) distance from one another in further embodiments. In principle, in accordance with the occurring orders of diffraction, a diffractive lens element has positive and negative focal lengths in accordance with $$f_{diff} = \frac{f_1}{k}, k = 0, \pm 1, \pm 2, \ldots \quad (1)$$

Here, $f_1$ denotes the focal length of the first positive order of diffraction and k denotes the beam index or the order of diffraction. Here, the intensity of the respective focus depends directly on the embodiment and approximation form of the underlying (approximately parabolic) phase profile. In combination with a refractive lens element with a focal length of $f_0$, a multi-focal optical system emerges with a plurality of used focal lengths $f_k$, k=0, ±1, ..., $k_{max}$, wherein the following applies approximately if the distance between the diffractive structure and the refractive lens element is neglected:

$$f_k \approx \frac{f_0 f_1}{f_1 + k f_0} \tag{2}$$

Figure 2B:
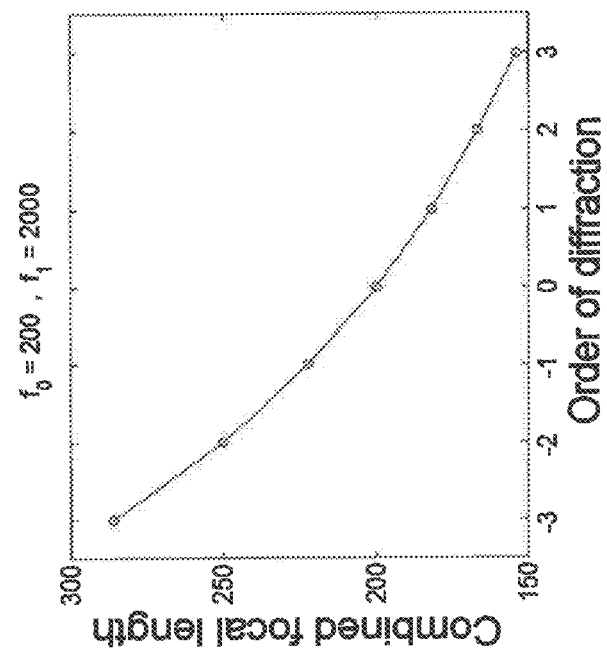

This relation is elucidated in FIG. 2B for $f_1 \gg f_0$.

The disclosure is not restricted to the configuration of the beam-splitting optical arrangement 110 with such a diffractive structure. Rather, what is important in the configuration of the beam-splitting optical arrangement is that it causes, where possible, spherical wavefront deformations of the beam that is incident on the beam-splitting optical arrangement. In further embodiments, use may also be made of a different beam-spitting optical arrangement suitable to this end, for example in the form of an etalon.

The partial beams emanating from the beam splitting optical arrangement are thereupon incident on—reference once again being made to FIG. 1—the sensor arrangement 120, on which different spot images corresponding to the focus offset are produced, the size of the spot images being smallest in the middle or in the perfect focus in the shown example and increasing toward the edge. The recording produced by the sensor arrangement 120 is denoted "121".

FIG. 3 shows a further embodiment of a measurement arrangement, wherein components analogous or substantially functionally identical to FIG. 1 are designated by reference numerals increased by "200". The embodiment of FIG. 3 differs from that of FIG. 1 in that provision is made here of a diffractive structure 310 in the form of a reflective element, with provision further being made of a spherical deflection mirror 307.

Figure 6B:
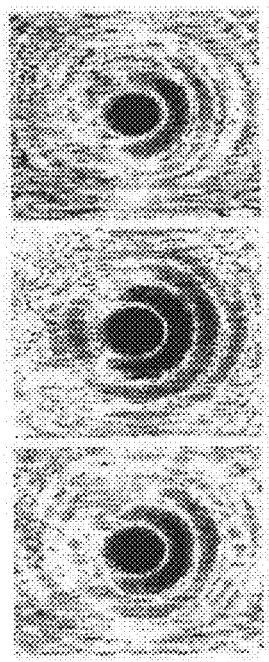
FIGS. 6A and 6B show schematic illustrations for explaining a problem underlying the disclosure.
Figure 6A:
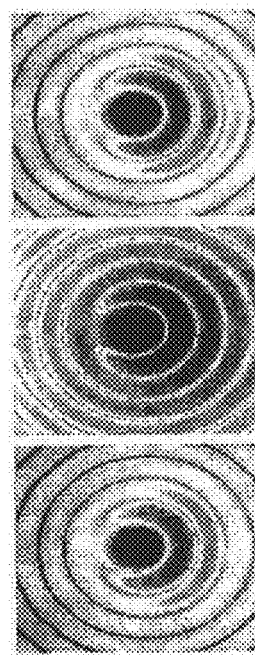

In principle, the recording of these individual spot images assigned to different focus positions in each case by the application of known, so-called "phase retrieval" methods (e.g. Gerchberg-Saxton algorithm) would allow a back calculation to the phase of the wavefront if the individual spot images were independent of one another (i.e. if there were no mutual influencing by way of interference). However, unavoidable interferences between the individual spot images are present in this case, the interferences leading to a pronounced mutual disturbance as indicated in FIG. 6 (with FIG. 6A showing ideal spot images without taking account of the interference and FIG. 6B showing real spot images with taking account of the interference).

Figure 4:
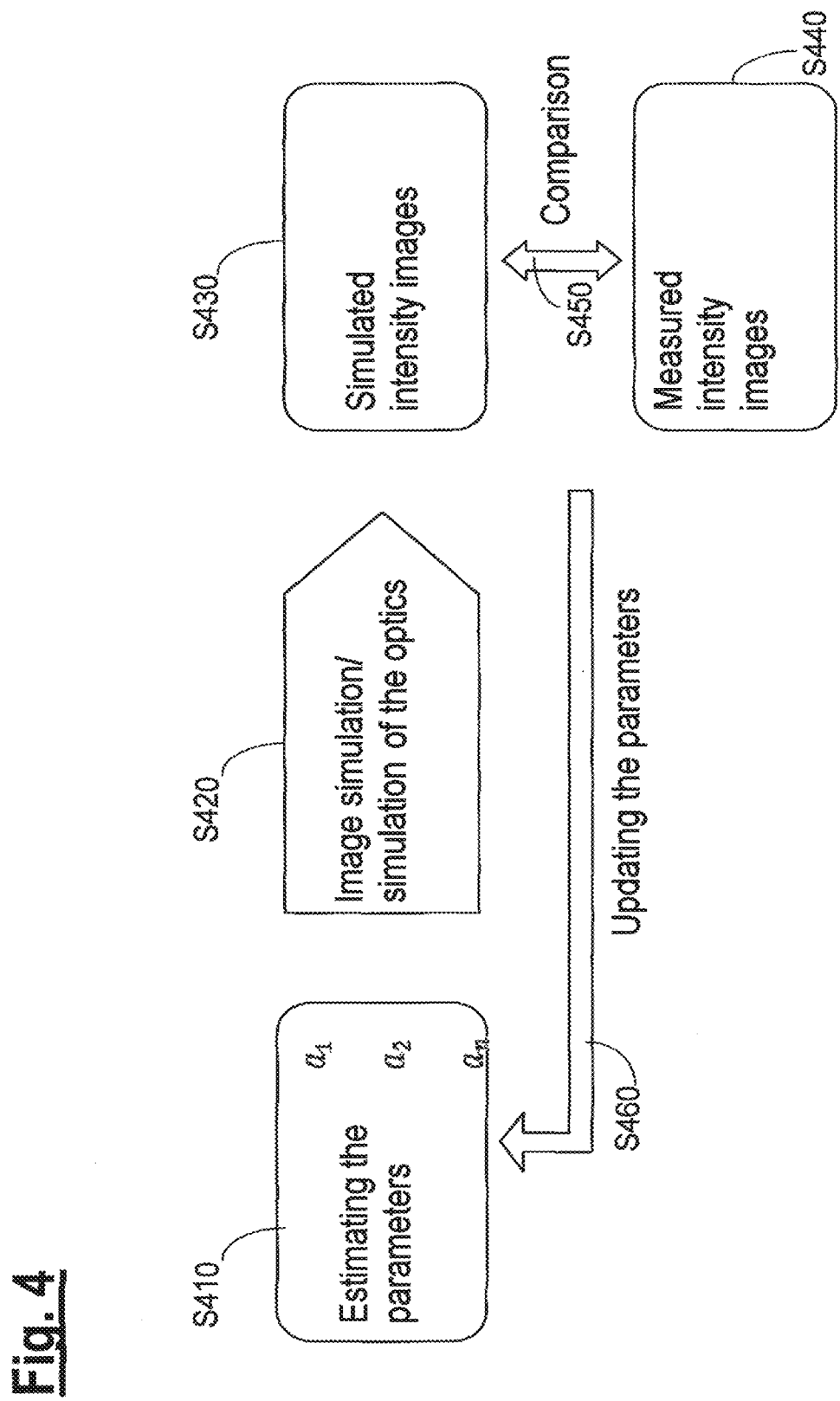
FIGS. 4 and 5 show schematic illustrations for explaining the possible sequence of a method according to the disclosure.
Figure 5:
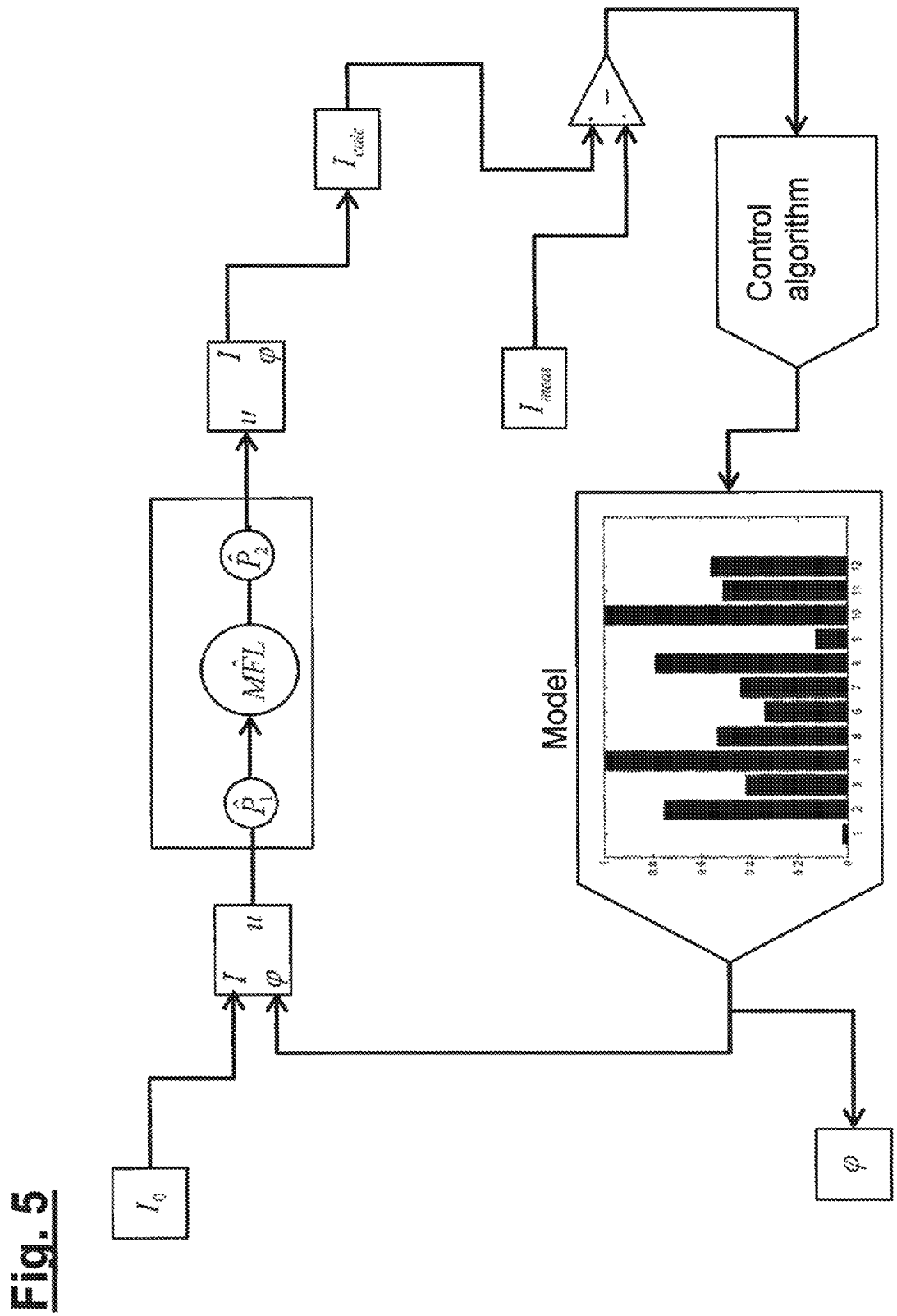

Mathematically, these circumstances mean that no unique back transformation is possible for directly calculating the beam parameters. In order to take account of this problem, iterative comparisons between respectively calculated or simulated images and the recorded measurement image are performed according to the disclosure in a model-based approach, as described below with reference to FIG. 4 and FIG. 5:

As indicated in the schematic diagram of FIG. 4, this is initially based on estimated values for the sought-after beam parameters (step S410), with the corresponding parameters set being denoted by $a_1, a_2, a_3, \ldots$ in this case.

These parameters for describing the beam may be, for example, the beam size, beam decentration in the x-direction, beam decentration the y-direction, beam inclination in the x-direction, beam inclination in the y-direction, beam divergence, astigmatism in the x-direction, astigmatism in the y-direction, coma in the x-direction, coma in the y-direction and spherical aberration. Here, a Zernike parameterization may also be effectuated when desired in order to describe and ascertain corresponding wavefront aberrations of higher order too.

Thereupon there is a forward simulation (step S420) for ascertaining a calculated image. According to FIG. 5, this forward simulation includes, in particular, a free space propagation $P_1$ in the form of a Fourier transform upstream of the beam-splitting optical arrangement 110 or 310 (with respect to the light propagation direction) and a free space propagation $P_2$, likewise in the form of a Fourier transform, downstream of the beam-splitting optical arrangement 110 or 310 (with respect to the light propagation direction), which each act on the complex amplitude function $u=\sqrt{I}\cdot e^{i\varphi}$.

If the assumption of a beam propagation in the positive z-direction is made, the beam amplitude to be determined (in the range of scalar diffraction) is denoted by $u(x, y|z_0)$ at the location $z_0$ in the reference plane (ideally near-field plane). After passing over the free space path between the reference plane and the plane of the effective optical element (beam-splitting optical arrangement 110 or diffractive optical structure), the amplitude present at the entrance of the optical element forming the beam-splitting optical arrangement 110 or 310 at the position $z_1$ is given by $$u(x,y|z_{1-})=\hat{P}_1 u(x,y|z_0)=\mathrm{IFT}_{xy}[\Pi(z_1-z_0)\cdot \mathrm{FT}_{xy}[u(x,y|z_0)]] \tag{3}$$

The optical element forming the beam-splitting optical arrangement 110 or 310, in the approximation of the infinitely thin element, multiplicatively impresses the amplitude function $T(x,y)=t(x,y)\cdot\exp(i\varphi(x,y))u(x, y|z_{1-})$ according to $$u(x,y|z_{1+})=T(x,y)u(x,y|z_{1-}) \tag{4}$$

By way of a further free space propagation from the optical element forming the beam-splitting optical arrangement 110 or 310 to the sensor arrangement 120 or 320 (the plane of which lies perpendicular to the z-axis at the position $z_2$), the amplitude on the plane of the sensor arrangement 120 or 320 is finally arrived at according to $$u(x,y|z_2)=\hat{P}_2 u(x,y|z_{1+})=\mathrm{IFT}_{xy}[\Pi(z_2-z_1)\cdot \mathrm{FT}_{xy}[u(x,y|z_{1+})]] \tag{5}$$

The intensity profile detected at the spatially-resolving sensor arrangement 120 or 320 is obtained by forming the square of the absolute value according to $$I_{Sensor}(x,y)=|u(x,y|z_2)|^2 \tag{6}$$

The propagator of the free space propagation is known from the formalism of Fourier optics. During the propagation from a plane perpendicular to the z-axis at the position z' to a parallel plane at the position z, the amplitude is initially transformed into the frequency space according to $$\tilde{u}(f_x,f_y|z')=\mathrm{FT}_{xy}[u(x,y|z')]=\iint dxdy\, u(x,y|z')\exp(-2\pi i(f_x x+f_y y)) \tag{7}$$

by way of the 2D Fourier transform and there it is multiplied by the free space propagation function $$\Pi(d \mid f_x, f_y) = \exp\left(2\pi i \frac{d}{\lambda} \gamma(f_x, f_y)\right) \quad (8)$$

over the distance $d=z-z'$. Here, the phase in the propagation function is given by $$\gamma(f_x, f_y) = \sqrt{1-\lambda^2(f_x^2+f_y^2)} \quad (9),$$

where $f_x$, $f_y$ denote the spatial frequencies and $\lambda$ denotes the wavelength of the radiation. The amplitude in the plane at z in the spatial domain is finally obtained by a back transformation by way of the inverse Fourier transform according to $$u(x, y \mid z) = \quad (10)$$
$$\int\int_A dxdy \Pi(z-z' \mid f_x, f_y)\tilde{u}(f_x, f_y \mid z')\exp(+2\pi i(f_x x + f_y y))$$

The correspondingly calculated image (containing the calculated intensity values $I_{calc}$) is subtracted from the recorded measurement image (containing the measured intensity values $I_{meas}$), whereupon appropriately modified model parameters for describing the beam are ascertained and these form the basis of a new forward simulation (step S460 in FIG. 4). Here, an optimization is performed, for example by applying a Levenberg-Marquardt algorithm. Thereupon, according to FIG. 5, the calculated intensity values $I_{calc}$ are ascertained anew by a forward simulation, with a new calculated image being obtained thereby, wherein the difference between the calculated image and the recorded measurement image is ascertained again. This is carried out iteratively until the difference between the calculated image and the recorded measurement image is sufficiently small (or falls below a predetermined threshold), whereupon the appropriate parameters for describing the beam are output.

As already explained above, it is particularly advantageous if the absolute value of the amplitude is available from the near-field measurement and if it need not be described and fitted by a model. As a result, firstly, the number of parameters to be described is reduced, possibly significantly reduced, and, secondly, the quality of the information obtained about the beam to be measured is improved.

According to the disclosure, the fact that enabling a large number of parameters leads to high numerical complexity is preferably further taken into account. Consequently, there preferably is initially a start with a comparatively small scope of the parameters set, which is then successively expanded with respect to the simultaneously varied parameters of the parameters set, i.e. adaptive fitting of the model is undertaken. Thus, for instance, if twenty parameters are sought after in principle, only ten dominating parameters may initially be enabled.

Furthermore, it is also possible to adapt the respective evaluation method or the algorithm in order to obtain the fastest possible speed for the beam analysis, for example after reaching a quasi-stationary operation of the respective system (e.g. a largely stably operated plasma light source), in which, typically, only small changes in the beam parameters still occur. Here, in particular, use can be made of the already collected information in order then to be able to determine and correct, in real time, the small changes in the beam parameters that still occur. In this phase, the originally nonlinear optimization problem may also be approximable in linear form. As a result, what may be achieved thus is that, for instance in a plasma light source, the laser beam can be guided, accurately and quickly at the same time, with respect to the beam parameters.

FIGS. 7-11 show schematic illustrations for explaining further embodiments of the disclosure. What is common to these embodiments is that, in this case, the beam-splitting optical arrangement according to the disclosure is configured in such a way that the beam splitting is effectuated in a "two-dimensional" manner to the extent that the beams with a longitudinal focus offset relative to one another that were produced during this split form, with respect to the points of incidence on the plane, a two-dimensional grid-like arrangement in, in each case, a plane transverse to the light propagation direction and hence—according to an aspect of this configuration—they are suitable, in particular, for effectively filling a two-dimensional sensor or detector area. According to a further aspect of this configuration, a significant measurement range increase can also be obtained hereby, as will be described in more detail below.

In order to obtain this two-dimensional beam split, it is possible—without the disclosure being restricted hereto—to provide, for example in the embodiment schematically illustrated in FIG. 7, two diffractive optical elements 711, 712, of which, in turn, the one diffractive element 711 is arranged in an exemplary manner upstream of a refractive optical element (refractive lens element) 713, which is present in a manner analogous to the embodiment of FIG. 2A, in relation to the light propagation direction (extending in the z-direction in the plotted coordinate system) and the other diffractive optical element 712 is arranged downstream of this refractive optical element 713. In further embodiments (some of which are schematically illustrated in FIGS. 8A-8E), the diffractive structure involved for the two-dimensional beam split may also be realized in any other suitable manner.

Figure 9:
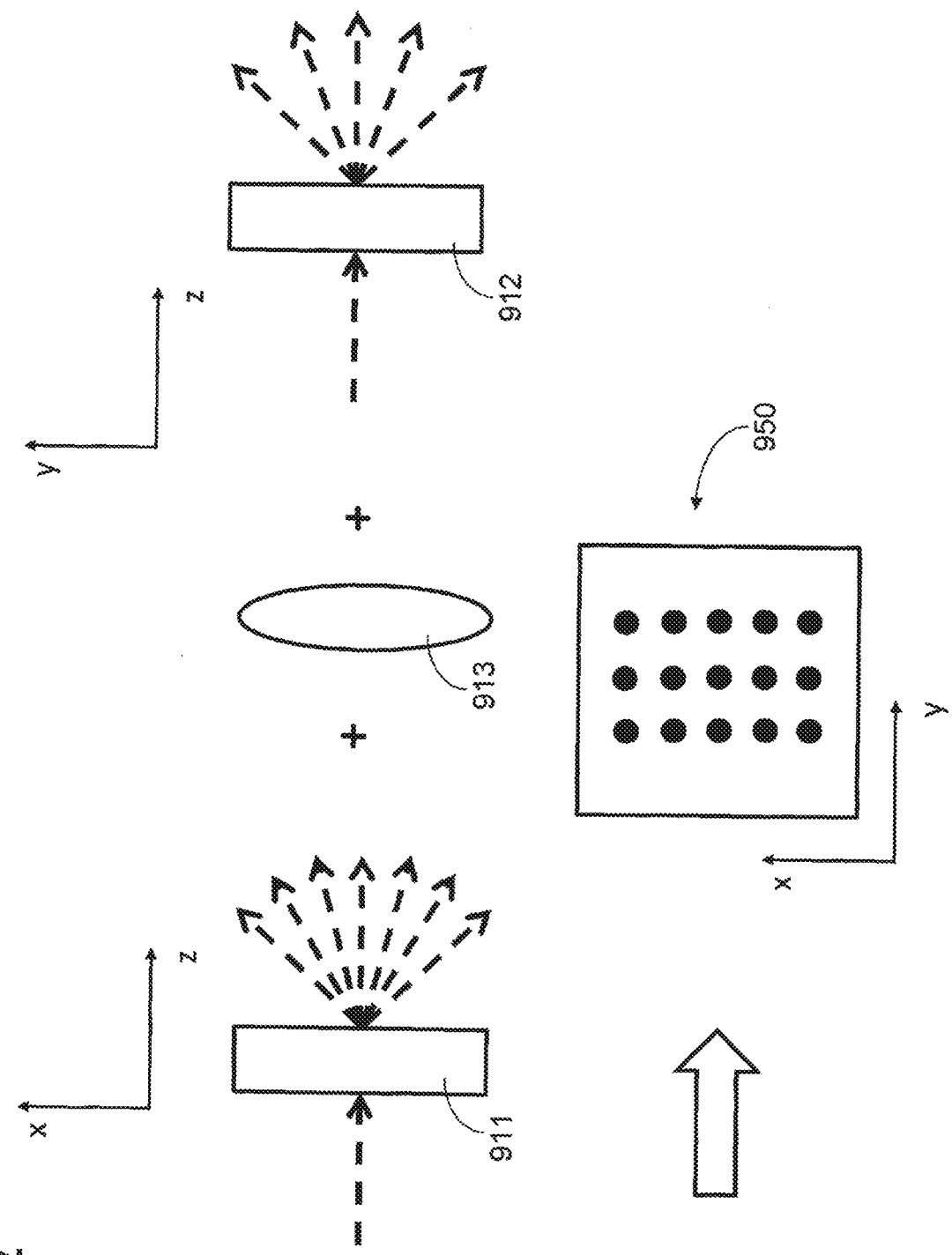

The mode of operation of the beam-splitting optical arrangement according to FIG. 7 formed by the diffractive optical elements 711, 712 and the refractive optical element 913 is elucidated in FIG. 9 (where analogous or functionally equivalent components are denoted by reference signs that have been increased by "200"). Accordingly, according to FIG. 9, the first diffractive optical element 911 produces a split of the incident beam with fanning into partial beams which diverge in the xz-plane and the second diffractive optical element 911 produces a split with fanning into partial beams which diverge in the yz-plane. The resultant two-dimensional beam distribution obtained in the sensor or detector plane is denoted by "950".

Figure 10:
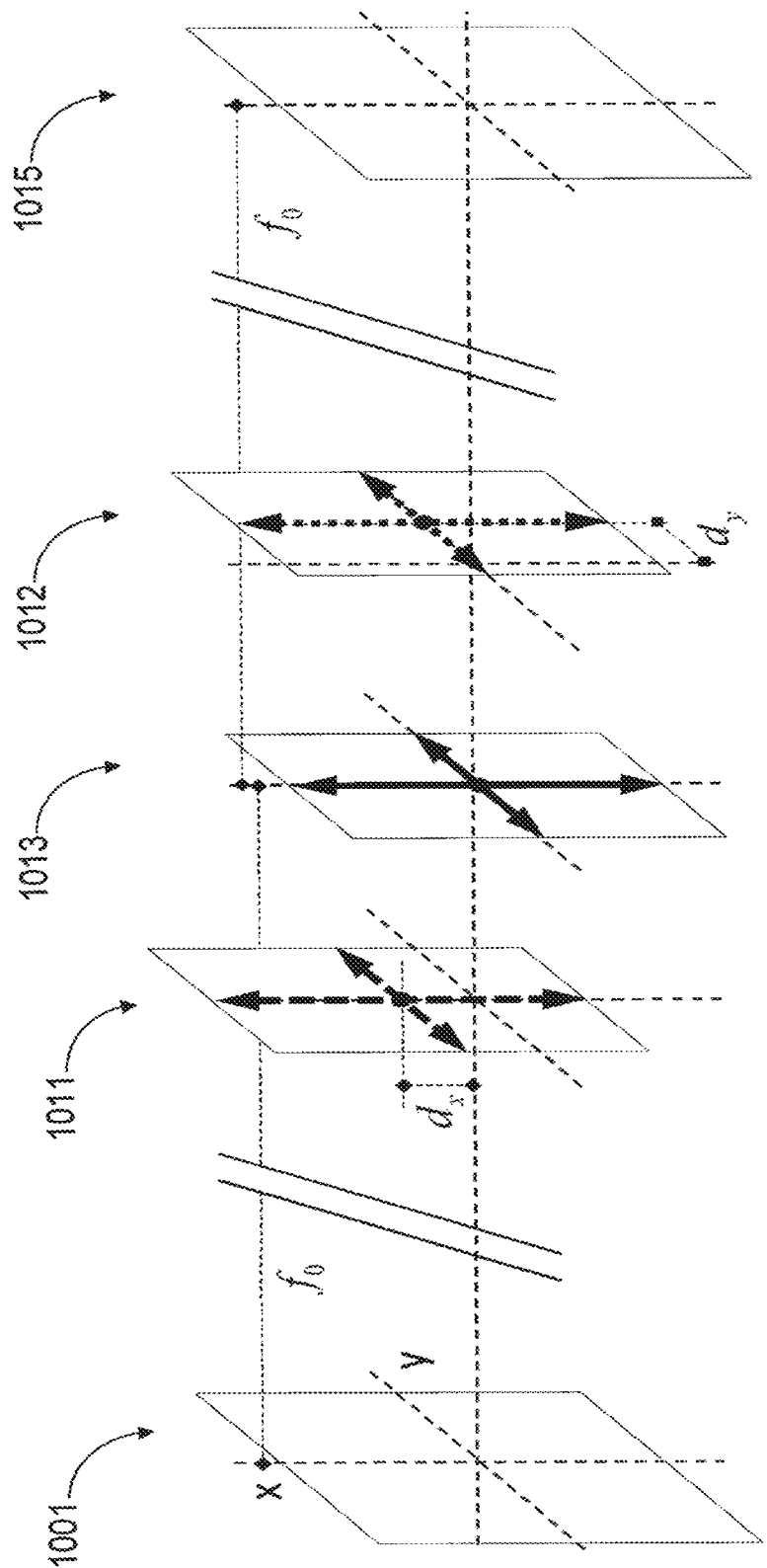

Proceeding from the basic construction of the beam-splitting optical arrangement according to FIG. 7 or FIG. 9, FIG. 10 shows a schematic illustration for explaining an exemplary geometric design. The two aforementioned diffractive optical elements are only indicated here by the respective planes 1011 and 1012, wherein, at the same time, a decentration by offsetting the respective diffractive structure in a plane perpendicular to the optical axis, respectively by distance "$d_x$" or "$d_y$", is indicated for the purposes of obtaining a lateral offset of the partial beams ("break of symmetry"). In FIG. 10, "1001" denotes the entrance plane of the beam and "1015" denotes the sensor or detector plane.

Analogous to the embodiment of FIG. 2A, the multifocal optical system formed by the beam-splitting optical arrangement according to FIG. 7 or 9 has a plurality of used focal lengths, wherein the following approximately applies if the distance between the diffractive optical elements and the refractive lens element is neglected here:

$$f_{m,n} \approx \frac{f_0 f_1^* f_2^*}{f_1^* n + f_2^* m + f_0 mn} \qquad (11)$$

Here, $f_1^*$ and $f_2^*$ denote (in relation to the respective first positive order of diffraction) the respective focal lengths of the first diffractive optical element 911 and the second diffractive optical element 912, respectively, and $f_0$ denotes the focal length of the refractive optical element 913, while "m" and "n" denote the orders of diffraction of the respective diffraction at the first optical element 911 and second diffractive optical element 912, respectively.

The focal lengths of the first diffractive optical element 911 and the second diffractive optical element 912 are selected to be different from one another, with the consequence that the element with the relatively shorter focal length produces the relatively greater longitudinal focus offset, and vice versa. In a specific exemplary embodiment, it is possible, for instance, for the focal length of the first diffractive optical element 911 to be greater by a factor of five than the focal length of the second diffractive optical element 912.

In the case of a suitable selection of the aforementioned parameters (i.e. the focal lengths $f_1^*$, $f_2^*$ and $f_0$) and of the used value ranges of the orders of diffraction (n, m), it is now possible to obtain and use a measurement range increase in different ways, as will be explained below with reference to FIGS. 11A-11C.

Figure 11A:
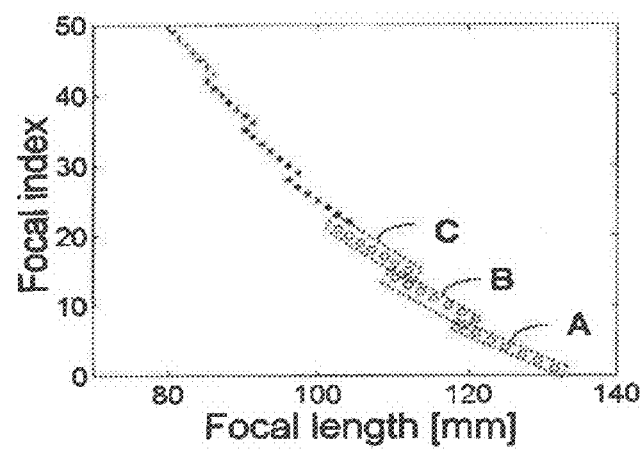

FIG. 11A initially shows a possible distribution of focal lengths obtained over the individual fanned beams using a beam-splitting optical arrangement according to the disclosure in accordance with FIG. 7 or 9. Here, a value group "A", "B", "C", . . . of in each case seven values or points in the diagram (corresponding to the number of orders of diffraction in the value range of −3 to +3 selected in an exemplary manner) in each case corresponds to a line in the two-dimensional beam distribution obtained in the sensor or detector plane. Firstly, it is clear that, as a consequence of the two-dimensional beam fanning, a measurement value increase is obtained in relation to the one-dimensional beam fanning that took place in the exemplary embodiment of FIG. 2A (which would have only resulted in a single one of the value groups "A", "B", "C", . . . ), with the consequence that a comparatively large measurement range of focal lengths is covered with, at the same time, a high resolution. Further, it is clear that, according to FIG. 11A, this measurement range increase can also be used for calibration purposes by virtue of redundancies namely being created to the extent that the value groups "A", "B", "C", . . . partly overlap with respect to the respective focal length values in the diagram of FIG. 11A. In further embodiments, it is also possible, as illustrated in FIG. 11B and FIG. 11C, to dispense with such redundancies for the benefit of a further increase of the measurement range of focal lengths covered overall, wherein the individual value groups "A", "B", "C", . . . of, in each case, seven values or points may be produced continuously (according to FIG. 11B) or else with a certain gaps or distances between the value groups "A", "B", "C", . . . (according to FIG. 11C).

Figure 11B:
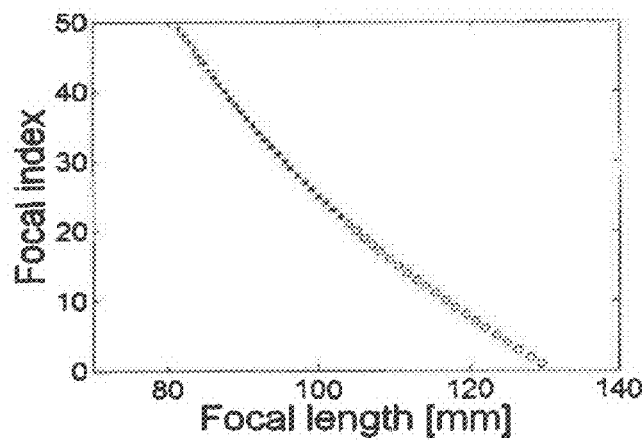
Figure 11C:
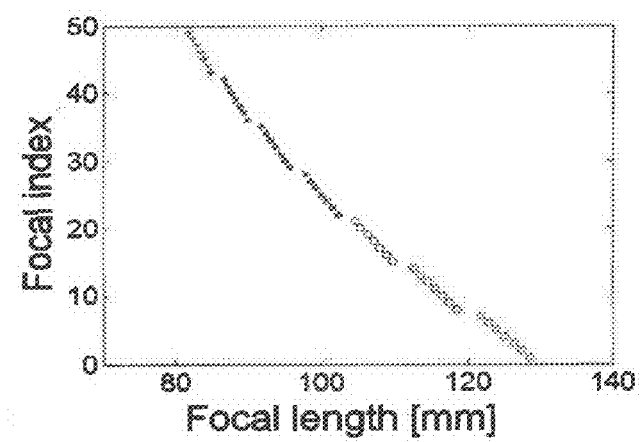

The above-described measurement range increase can be used to take account of the large focus variations of the respective beam to be characterized, as occur, for example in applications of material processing, in particular at high laser powers, as a consequence of heating and deformation of the individual optical components, namely by virtue of the "capture region" of the respective focus values being significantly increased (for example, by approximately a factor of seven according to FIGS. 11A-11C) with an unchanged high resolution. Further particularly, this measurement range increase can be used to realize an overall ISO-compliant beam characterization to the extent that measurement points are obtained in, respectively, a "sufficient" number or a number that is prescribed by the respective ISO standard, both in the immediate vicinity of the focus and also at a sufficient distance from the focus (e.g. at a distance of two Raleigh lengths) of the beam.

In further embodiments (some of which are schematically illustrated in FIGS. 8A-8E), the diffractive structure involved for the two-dimensional beam split may also be obtained in any other suitable manner. Here, the sensor arrangement (e.g. CCD camera) is respectively denoted by "815" in FIGS. 8A-8E.

According to FIGS. 8A-8B, use can also be made of a single diffractive optical element 811 or 821, which is already inherently "two-dimensional" (i.e. it has periodic diffractive structures in mutually different, in particular perpendicular directions), instead of two diffractive optical elements, and the single diffractive optical element may be arranged, in relation to the light propagation direction, either upstream (FIG. 8A) or downstream (FIG. 8B) of the refractive optical element 813 or 823 in a beam-splitting optical arrangement 810 or 820. According to FIG. 8C, the diffractive structures (which, in turn, extend in mutually different, in particular perpendicular directions) may also be designed on plano-convex lens elements 831, 832 in a beam-splitting optical arrangement 830. According to FIG. 8D, a beam-splitting optical arrangement 840 may also have a diffractive optical element 841 with a complex diffractive structure (e.g. as a complex-encoded CGH), which brings about a diffraction in mutually different, in particular perpendicular directions, in combination with a refractive lens element 843, wherein, in this configuration too, the diffractive optical element 841 may be alternatively arranged downstream, in relation to the light propagation direction, of the refractive lens element 843 as well. According to FIG. 8E, a beam-splitting optical arrangement 850 may also be configured as a refractive lens element 851, which has diffractive structures on both its light entry face and its light exit face. In all of the above-described embodiments, the diffractive optical elements or diffraction gratings may be realized as amplitude gratings, phase gratings or hybrid gratings.

Even though the disclosure has been described on the basis of specific embodiments, numerous variations and alternative embodiments are apparent to a person skilled in the art, for example by combination and/or exchange of features of individual embodiments. Accordingly, it goes without saying for a person skilled in the art that such variations and alternative embodiments are concomitantly encompassed by the present disclosure, and the scope of the disclosure is restricted only within the meaning of the accompanying patent claims and the equivalents thereof.

What is claimed is:

1. An apparatus, comprising:
    a beam-splitting optical arrangement configured to split a beam incident on the beam-splitting optical arrangement along an optical axis into a plurality of partial beams having a focus offset in a longitudinal direction relative the optical axis;
    a sensor arrangement configured to capture an image of the partial beams; and
    a controller configured to:

a) perform a forward simulation of the beam in the optical system based on estimated initial values for beam parameters to obtain a simulated image; and
b) calculate a set of values for the beam parameters based on a comparison between the simulated image and the measurement image,
wherein the controller is configured to:
c) iteratively perform a) and b), wherein, in each case, the calculated set of values for the beam parameters provide the basis of the forward simulation that following; and
d) output the sets of values for the beam parameters ascertained in c).

2. The apparatus of claim 1, wherein c) reduces a number of varied beam parameters.

3. The apparatus of claim 1, wherein the controller is configured to vary an algorithm used during c).

4. The apparatus of claim 1, wherein the apparatus is configured to record a near-field image produced by the beam.

5. The apparatus of claim 1, wherein the apparatus is configured to simultaneously record:
i) a near-field image produced by the beam; and
ii) a far-field image corresponding to the measurement image produced by the partial beams.

6. The apparatus of claim 1, wherein the plurality of beam parameters comprises at least one parameter selected from the group consisting of beam size, beam decentration, beam inclination, beam divergence, astigmatism, coma, and spherical aberration.

7. The apparatus of claim 1, wherein the apparatus is configured so that, during use of the apparatus, the beam is manipulated on the basis of the output values for the beam parameters while adapting at least one of the beam parameters.

8. The apparatus of claim 7, wherein the apparatus is configured so that, during use of the apparatus, outputting the output values and manipulating the beam occur in real time.

9. The apparatus of claim 1, wherein the beam-splitting optical arrangement is configured provide spherical wave-front deformations of the beam.

10. The apparatus of claim 9, wherein the beam-splitting optical arrangement comprises a diffractive structure.

11. The apparatus of claim 9, wherein the beam-splitting optical arrangement is configured so that points of incidence of the partial beams define a two-dimensional, grid-like distribution on a plane extending transversely to a light propagation direction of the beam.

12. The apparatus of claim 10, wherein the beam-splitting optical arrangement comprises two diffractive structures extending in mutually different directions.

13. The apparatus of claim 12, wherein the diffractive structures differ by at least a factor of three in terms of their focal length related to the first positive order of diffraction in each case.

14. The apparatus of claim 1, wherein the beam comprises a laser beam.

15. The apparatus of claim 1, further comprising a laser plasma source.

16. A beam-splitting arrangement, comprising:
a first periodic diffractive structure extending in a first direction; and
a second period diffractive structure extending in a second direction different from the first direction,
wherein the beam-splitting optical arrangement is configured to split a beam incident thereon along an optical axis into a plurality of partial beams having a focus offset in a longitudinal direction relative to the optical axis so that points of incidence of the partial beams define a two-dimensional, grid-like distribution on a plane extending transversely to a propagation direction of the beam.

17. The beam-splitting arrangement of claim 16, wherein the beam-splitting optical arrangement brings about spherical wave-front deformations of the beam.

18. The beam-splitting arrangement of claim 16, wherein the diffractive structures differ by at least a factor of three in terms of their focal length related to the first positive order of diffraction in each case.

19. The beam-splitting arrangement of claim 16, wherein the beam is a laser beam.

20. The beam-splitting arrangement of claim 16, further comprising a laser plasma source.

21. The beam-splitting arrangement of claim 18, wherein the second direction is perpendicular to the first direction.

22. The beam-splitting arrangement of claim 16, wherein the second direction is perpendicular to the first direction.

* * * * *

UNITED STATES PATENT AND TRADEMARK OFFICE
CERTIFICATE OF CORRECTION

PATENT NO. : 11,054,305 B2  
APPLICATION NO. : 16/694115  
DATED : July 6, 2021  
INVENTOR(S) : Matthias Manger et al.

Page 1 of 1

It is certified that error appears in the above-identified patent and that said Letters Patent is hereby corrected as shown below:

On the Title Page

Column 2, item [56], Line 2, delete "2017." and insert -- 2017, 2 pages. --;

In the Specification

Column 8, Line 12, delete "disclosure." and insert -- disclosure; --;

In the Claims

Column 15, Line 42, Claim 9, after "configured" insert -- to --;

Column 16, Line 31, Claim 17, delete "wave-front" and insert -- wavefront --.

Signed and Sealed this  
Eighteenth Day of January, 2022

Drew Hirshfeld  
*Performing the Functions and Duties of the*  
*Under Secretary of Commerce for Intellectual Property and*  
*Director of the United States Patent and Trademark Office*